(12) United States Patent
Takahashi et al.

(10) Patent No.: US 10,364,866 B2
(45) Date of Patent: Jul. 30, 2019

(54) GEAR DEVICE

(71) Applicant: NABTESCO CORPORATION, Tokyo (JP)

(72) Inventors: Masahiro Takahashi, Mie (JP); Yuto Nakai, Mie (JP); Koji Nakamura, Mie (JP)

(73) Assignee: NABTESCO CORPORATION, Tokyo (JP)

( * ) Notice: Subject to any disclaimer, the term of this patent is extended or adjusted under 35 U.S.C. 154(b) by 135 days.

(21) Appl. No.: 15/639,504

(22) Filed: Jun. 30, 2017

(65) Prior Publication Data
US 2018/0017134 A1     Jan. 18, 2018

(30) Foreign Application Priority Data

Jul. 12, 2016    (JP) .................................. 2016-137751

(51) Int. Cl.
*F16H 1/32*     (2006.01)

(52) U.S. Cl.
CPC ......... *F16H 1/32* (2013.01); *F16H 2001/323* (2013.01); *F16H 2001/327* (2013.01)

(58) Field of Classification Search
CPC ...... F16H 1/32; F16H 1/321; F16H 2001/323; F16H 2001/327
See application file for complete search history.

(56) References Cited

U.S. PATENT DOCUMENTS

| 4,594,915 A | 6/1986 | Braren | |
|---|---|---|---|
| 6,033,333 A * | 3/2000 | Muraki | F16H 1/32 |
| | | | 475/178 |
| 6,679,801 B2 * | 1/2004 | Nohara | F16H 1/32 |
| | | | 184/6.12 |

(Continued)

FOREIGN PATENT DOCUMENTS

| GB | 2117081 A | 10/1983 |
|---|---|---|
| JP | 2006-043809 A | 2/2006 |
| JP | 5563831 B2 | 7/2014 |

OTHER PUBLICATIONS

Extended European Search Report EP Application No. 17179682.4 dated Dec. 15, 2017.

*Primary Examiner* — David R Morris
(74) *Attorney, Agent, or Firm* — Pillsbury Winthrop Shaw Pittman, LLP

(57) ABSTRACT

A gear device is provided with a carrier having a first member and a second member opposed to the first member in a rotation axis direction, a crankshaft configured to cause the carrier to rotate relative to an outer cylinder about a rotation axis, an insertion pin inserted into the first member and the second member, and a restriction member configured to restrict movement of the insertion pin. The insertion pin is housed in such a manner as to extend from a first hole over to a second hole, the first hole formed in the first member so as to extend through the first member, the second hole formed in the second member so as to correspond to the first hole. At least one of the first hole and the second hole (Continued)

has such a shape as to restrict movement of the insertion pin toward the second hole in the rotation axis direction. The restriction member is mounted in the first member so as to restrict movement of the insertion pin toward the first hole in the rotation axis direction.

10 Claims, 4 Drawing Sheets

(56) References Cited

U.S. PATENT DOCUMENTS

| | | | | |
|---|---|---|---|---|
| 8,029,400 | B2* | 10/2011 | Nakamura | B25J 9/102 475/162 |
| 8,195,429 | B2* | 6/2012 | Inoue | F16H 57/0402 702/184 |
| 8,323,140 | B2* | 12/2012 | Nakamura | F16H 1/32 475/179 |
| 8,444,520 | B2* | 5/2013 | Nakamura | F16H 1/32 475/162 |
| 8,684,879 | B2* | 4/2014 | Nakamura | F16H 1/32 475/179 |
| 9,097,322 | B2* | 8/2015 | Nakamura | F16H 1/32 |
| 9,201,055 | B2* | 12/2015 | Ohnuma | G01N 21/251 |
| 9,329,119 | B2* | 5/2016 | Shirata | B25J 9/102 |
| 9,406,173 | B2* | 8/2016 | Inoue | F16H 57/0402 |
| 9,435,731 | B2* | 9/2016 | Ohnuma | G01N 21/251 |
| 9,556,933 | B2* | 1/2017 | Fujimoto | F16H 1/32 |
| 10,042,343 | B2* | 8/2018 | Ohishi | G05B 19/04 |
| 2002/0155915 | A1* | 10/2002 | Tanaka | F16H 1/32 475/162 |
| 2003/0054912 | A1* | 3/2003 | Nohara | F16H 1/32 475/162 |
| 2009/0228239 | A1* | 9/2009 | Inoue | F16H 57/0402 702/184 |
| 2009/0247349 | A1* | 10/2009 | Nakamura | F16H 1/32 475/162 |
| 2010/0179013 | A1* | 7/2010 | Nakamura | B25J 9/102 475/179 |
| 2011/0015024 | A1* | 1/2011 | Nakamura | F16H 1/32 475/162 |
| 2012/0108381 | A1* | 5/2012 | Nakamura | F16H 1/32 475/180 |
| 2012/0203509 | A1* | 8/2012 | Inoue | F16H 57/0402 702/184 |
| 2013/0250303 | A1* | 9/2013 | Shirata | B25J 9/102 356/436 |
| 2014/0171250 | A1* | 6/2014 | Nakamura | F16H 1/32 475/162 |
| 2015/0176680 | A1* | 6/2015 | Fujimoto | F16H 1/32 475/162 |
| 2016/0041088 | A1* | 2/2016 | Ohnuma | G01N 21/251 356/70 |
| 2016/0070247 | A1* | 3/2016 | Ohishi | G05B 19/04 700/275 |
| 2017/0174251 | A1* | 6/2017 | Nakamura | B62D 5/0409 |
| 2017/0335944 | A1* | 11/2017 | Nishimura | F16H 1/32 |
| 2018/0017133 | A1* | 1/2018 | Takahashi | F16H 1/32 |

* cited by examiner

GEAR DEVICE

BACKGROUND OF THE INVENTION

1. Technical Field

The present invention relates to a gear device.

2. Background

In recent years, various types of gear devices have been developed in various technical fields such as industrial robots and machine tools. As one example of such a gear device, Japanese Patent No. 5563831 describes a gear transmission device provided with, as shown in FIG. 4, an inner-tooth member 200 having an inner-tooth gear formed on an inner periphery thereof, a carrier 300 rotatably supported to the inner-tooth member 200, and a crankshaft 400 rotatably supported to the carrier 300 and configured to rotate said carrier 300 and the inner-tooth member 200 relative to each other.

In the gear transmission device described in this publication, the carrier 300 has a one-side support member 310, an other-side support member 320 opposed to said one-side support member 310, and a columnar portion 330 formed integrally with the other-side support member 320 and extending from the other-side support member 320 to the one-side support member 310. Further, the one-side support member 310 and the columnar portion 330 have tapered holes 311 and 331 formed therein, respectively, so as to be arranged coaxially with each other. An insertion pin 500 is inserted from a one-side axis direction end surface 310A side of the one-side support member 310 into the tapered holes 311 and 331, and thus positioning of the one-side support member 310 and the other-side support member 320 is performed.

By the way, in a case where the insertion pin 500 is supported by the carrier 300 only by forced insertion of said insertion pin 500 into the tapered holes 311 and 331, there is a possibility that, due to rotation of the carrier 300, the insertion pin 500 might slip out from the one-side axis direction end surface 310A side.

To avoid this, in the gear transmission device described in this publication, a through hole 321 extending from the other-side axis direction end surface 320A up to the tapered hole 331 of the columnar portion 330 is formed in the other-side support member 320, and a female screw portion 510 open to a side of said through hole 321 is formed in the insertion pin 500. In this configuration, a bolt 600 inserted from an other-side axis direction end surface 320A side into the through hole 321 is engaged with the female screw portion 510 of the insertion pin 500, and thus the insertion pin 500 is supported by the carrier 300 via the bolt 600.

In the gear transmission device disclosed in this publication, compared with a case where the insertion pin 500 is supported by the carrier 300 only by forced insertion of said insertion pin 500, the insertion pin 500 can be inhibited from slipping out of the tapered holes 311 and 331. It is, however, required that the through hole 321 for inserting the bolt 600 thereinto be formed in the other-side support member 320 and that the bolt 600 be inserted from an opposite direction to an insertion direction of the insertion pin 500. This complicates an assembly process of a gear transmission device.

SUMMARY OF THE INVENTION

The present invention has as its object to provide a gear device capable of preventing slipping-out of an insertion pin without complicating an assembly process.

A gear device according to the present invention is provided with a carrier having a first member and a second member opposed to the first member in a direction of a rotation axis, a crankshaft configured to cause relative rotation between an outer cylinder and the carrier about the rotation axis, an insertion pin inserted into the first member and the second member, and a restriction member configured to restrict movement of the insertion pin. The insertion pin is housed in such a manner as to extend from a first hole over to a second hole, the first hole formed in the first member so as to extend through the first member, the second hole formed in the second member so as to correspond to the first hole. At least one of the first hole and the second hole has such a shape as to restrict movement of the insertion pin toward the second hole in the rotation axis direction. The restriction member is mounted in the first member so as to restrict movement of the insertion pin toward the first hole in the rotation axis direction.

According to the gear device of the present invention, it is possible to prevent slipping-out of an insertion pin without complicating an assembly process.

Objects, features, and advantages of the above-mentioned technique will become more apparent from the following detailed description and the appended drawings.

DESCRIPTION OF EMBODIMENTS

Figure 1:
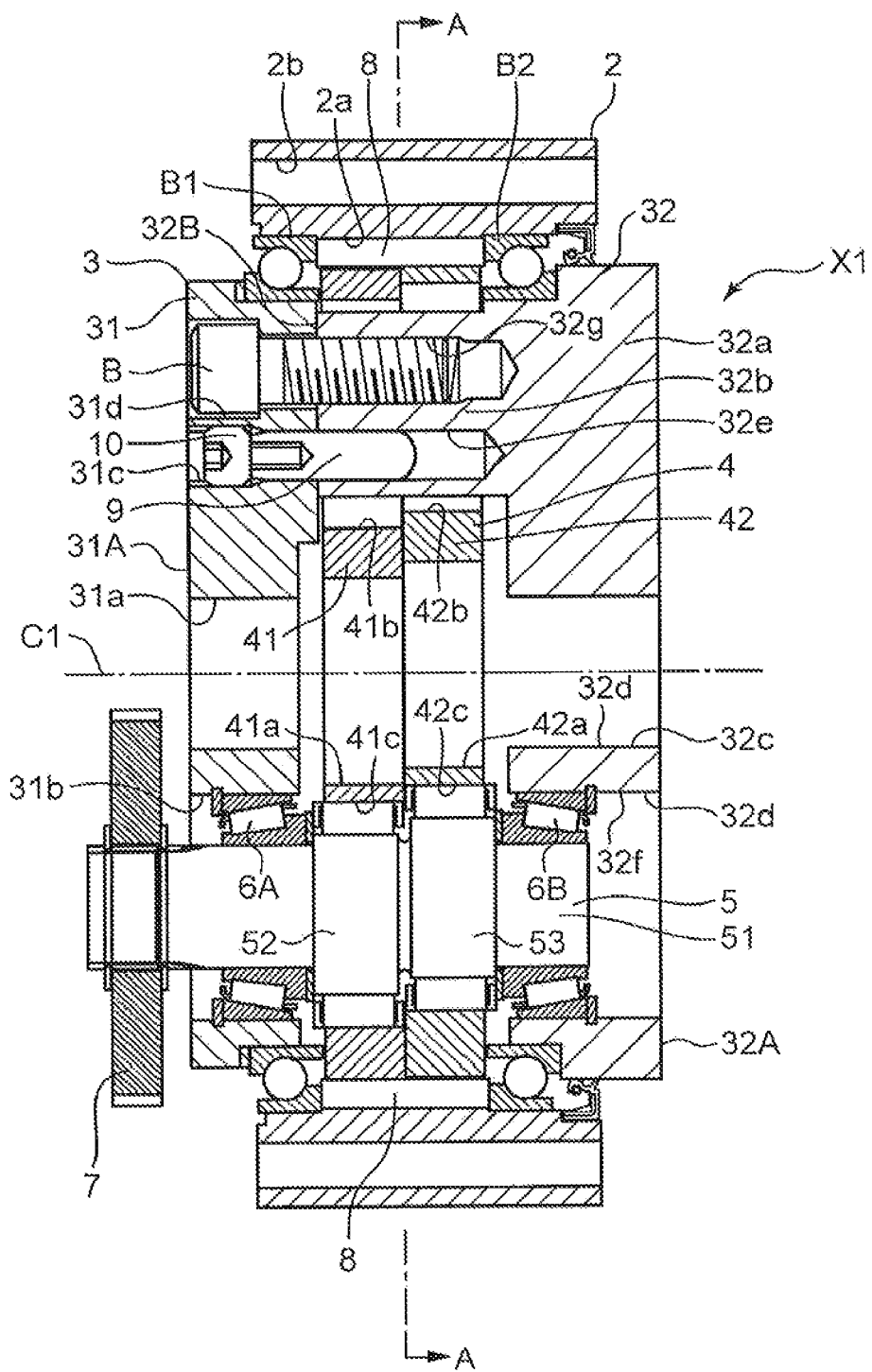
FIG. 1 is a schematic sectional view of a gear device according to this embodiment.

Embodiments of the present invention will now be described with reference to the appended drawings. For the sake of convenience of explanation, the drawings referred to below show, in a simplified form, only principal ones of constituent components of a gear device X1 according to this embodiment. Therefore, the gear device X1 according to this embodiment may include arbitrary constituent components not shown in the drawings referred to in this specification.

Figure 2:
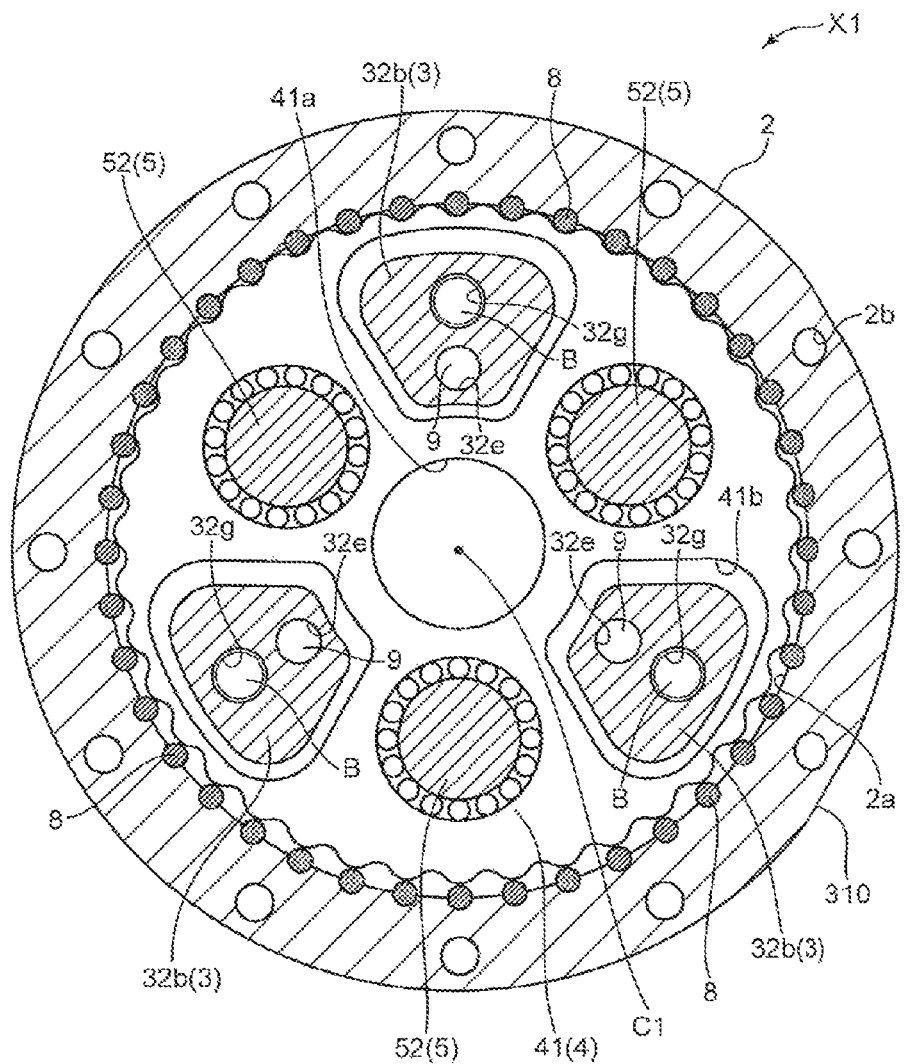
FIG. 2 is a schematic sectional view of the gear device along a line A-A shown in FIG. 1.

As shown in FIG. 1 and FIG. 2, the gear device X1 may be an eccentric oscillating gear device and be provided with an outer cylinder 2, a carrier 3, an oscillating gear 4, a crankshaft 5, and a transmission gear 7. In the gear device X1, an input torque may be transmitted to the crankshaft 5 via the transmission gear 7 and cause said crankshaft 5 to rotate. As the crankshaft 5 rotates, the oscillating gear 4 performs oscillating rotation, thus causing the outer cylinder 2 and the carrier 3 to rotate relative to each other.

The outer cylinder 2 may be formed in a substantially circular cylindrical shape whose center axis corresponds with a rotation axis C1. A plurality of pin grooves may be formed on an inner peripheral surface 2a of the outer cylinder 2. Each of the pin grooves may extend in a rotation axis C1 direction and have a semicircular cross-sectional shape in a cross section orthogonal to said rotation axis C1 direction. The pin grooves may be arranged in a circumferential direction of the outer cylinder 2 at regular intervals.

The gear device X1 may be provided further with a plurality of inner-tooth pins 8 mounted on the inner peripheral surface 2a of the outer cylinder 2. Each of the inner-tooth pins 8 may be formed in a circular columnar shape extending in the rotation axis C1 direction. Furthermore, the inner-tooth pins 8 may be mounted in the pin grooves formed on the inner peripheral surface 2a of the outer cylinder 2, respectively.

A plurality of mounting holes 2b passing through the outer cylinder 2 in the rotation axis C1 direction may be formed in said outer cylinder 2. The mounting holes 2b may be arranged in the circumferential direction of the outer cylinder 2 at regular intervals. The mounting holes 2b may be used, for example, in mounting an unshown counterpart member to the outer cylinder 2. In a case where the counterpart member mounted to the outer cylinder 2 is a base member that is not intended to rotate, the outer cylinder 2 may form a fixed-side member in the gear device X1.

The carrier 3 may be configured to be rotatable relative to the outer cylinder 2 about the rotation axis C1. The carrier 3 may be configured to hold the oscillating gear 4 from both sides in the rotation axis C1 direction and disposed concentrically with the outer cylinder 2. The carrier 3 may have a first member 31 and a second member 32 opposed to each other in the rotation axis C1 direction. The first member 31 and the second member 32 may be fastened to each other via a fastening member B.

The first member 31 may be formed in a substantially disc shape. A part of the first member 31 may be positioned inside the outer cylinder 2, while a remaining part of the first member 31 may be positioned outside the outer cylinder 2 in the rotation axis C1 direction. The first member 31 may include a surface opposed to the second member 32 in the rotation axis C1 direction and a first axis direction end surface 31A positioned on an opposite side to said surface.

A center hole 31a, a crankshaft hole 31b, a first hole 31c, and an insertion hole 31d may be formed in the first member 31.

The center hole 31a may be formed at a center portion of the first member 31 so as to pass through the first member 31 from the first axis direction end surface 31A over to the opposed surface along the rotation axis C1. A center of the center hole 31a may correspond with the rotation axis C1.

The crankshaft hole 31b may be a hole for housing a part of the crankshaft 5 therein. The crankshaft hole 31b may be provided side by side with the center hole 31a in a radial direction of the carrier 3. In this embodiment, three crankshaft holes 31b may be arranged on an outer side of the center hole 31a in a circumferential direction of the carrier 3. Each of the crankshaft holes 31b may be a through hole passing through the first member 31 from the first axis direction end surface 31A to the opposed surface in the rotation axis C1 direction. The number of the crankshaft holes 31b may be arbitrary and changed as appropriate in accordance with the number of the after-mentioned crankshafts 5.

The first hole 31c may be a hole for housing therein an insertion pin 9 and a restriction member 10, which will be mentioned later. The first hole 31c may be positioned on an outer side of the center hole 31a in the radial direction of the carrier 3, and a plurality of first holes 31c may be provided to be arranged in the circumferential direction of said carrier 3. Each of the first holes 31c may be formed so as to pass through the first member 31 in the rotation axis C1 direction.

The insertion hole 31d may be a hole for inserting the fastening member B thereinto. The insertion hole 31d may be positioned on an outer side of the center hole 31a in the radial direction of the carrier 3, and a plurality of insertion holes 31d may be provided to be arranged in the circumferential direction of said carrier 3. In this embodiment, each of the insertion holes 31d may be provided on an outer side of each of the first holes 31c side by side with said each of the first holes 31c in the radial direction of the carrier 3. Each of the insertion holes 31d may be formed so as to pass through the first member 31 in the rotation axis C1 direction. A head portion of the fastening member B may be housed in each of the insertion holes 31d.

The second member 32 may have a substantially disc-shaped substrate portion 32a and a shaft portion 32b extending from said substrate portion 32a to a first member 31 side.

The substrate portion 32a may be positioned away from the first member 31 in the rotation axis C1 direction. In this embodiment, a part of the substrate portion 32a may be positioned inside the outer cylinder 2, while a remaining part of the substrate portion 32a may be positioned outside the outer cylinder 2 in the rotation axis C1 direction. The substrate portion 32a may include a shaft surface linking to the shaft portion 32b in the rotation axis C1 direction and a second axis direction end surface 32A positioned on an opposite side to said shaft surface.

The shaft portion 32b may protrude in the rotation axis C1 direction from the shaft surface of the substrate portion 32a toward the first member 31 A plurality of shaft portions 32b may be provided to be arranged in the circumferential direction of the carrier 3. In this embodiment, the second member 32 may have three shaft portions 32b.

Each of the shaft portions 32b may be opposed to the first member 31 in the rotation axis C1 direction and have an opposed surface 32B that comes in contact with said first member 31. Each of the shaft portions 32b may be provided so that the opposed surface 32B overlie the first hole 31c and the insertion hole 31d in the rotation axis C1 direction.

While in this embodiment, the substrate portion 32a and the shaft portion 32b may be formed integrally with each other, without any limitation thereto, it may also be possible that the substrate portion 32a and the shaft portion 32b are formed separately from each other. In this case, the substrate portion 32a and the shaft portion 32b may be connected to each other via a fastening member such as, for example, a bolt.

A center hole 32c, a crankshaft hole 32d, a second hole 32e, and a female screw hole 32g may be formed in the second member 32.

The center hole 32c may be formed in a center portion of the substrate portion 32a so as to pass through the substrate portion 32a of the second member 32 from a second axis direction end surface 32A to the shaft surface along the rotation axis C1. A center of the center hole 32c may correspond with the rotation axis C1.

The crankshaft hole 32d may be a hole for housing a part of the crankshaft 5 therein. The crankshaft hole 32d may be provided side by side with the center hole 32c in the radial direction of the carrier 3. In this embodiment, three crankshaft holes 32d may be arranged on an outer side of the center hole 32c in the circumferential direction of the carrier 3. Each of the crankshaft holes 32d may be a through hole passing through the substrate portion 32a of the second member 32 from the second axis direction end surface 32A to the shaft surface in the rotation axis C1 direction. The number of the crankshaft holes 32d may be arbitrary and changed as appropriate in accordance with the number of the after-mentioned crankshafts 5.

The second hole 32e may be a hole for housing the after-mentioned insertion pin 9 therein. The second hole 32e may be open on the opposed surface 32B of each of the shaft portions 32b and be a bottomed surface having a bottom surface 32f. In the rotation axis C1 direction, the second holes 32e may be continuous with the first holes 31c of the first member 31, respectively.

The female screw hole 32g may be a hole to be engaged with a male screw section of the fastening member B. A plurality of female screw holes 32g may be formed in such a manner that a part of the opposed surface 32B of each of the shaft portions 32b is concaved. In the rotation axis C1 direction, the female screw holes 32g may be continuous with the insertion holes 31d of the first member 31, respectively. The fastening member B may be inserted into the carrier 3 via the insertion hole 31d so that the male screw section of said fastening member B is engaged with the female screw hole 32g of the shaft portion 32b, and thus the first member 31 and the second member 32 may be fastened to each other.

The crankshaft 5 may cause relative rotation between the carrier 3 and the outer cylinder 2 about the rotation axis C1. The crankshaft 5 may be housed in the crankshaft holes 31b and 32d The crankshaft 5 may be configured so that a part of said crankshaft 5 is rotatably supported by an inner peripheral surface of the crankshaft hole 31b and an inner peripheral surface of the crankshaft hole 32d. Specifically, the gear device X1 may be provided further with crank bearings 6A and 6B that permit rotation of the crankshaft 5 with respect to the carrier 3. Further, the crankshaft 5 may be supported by the respective inner peripheral surfaces of the crankshaft holes 31b and 32d via said crank bearings 6A and 6B, respectively. In this embodiment, three crankshafts 5 may be provided to be arranged in the circumferential direction of the carrier 3. The number of the crankshafts 5 may be arbitrary and can be changed as appropriate in accordance with an application of the gear device X1.

The crankshaft 5 may have a shaft main body 51 extending in the rotation axis C1 direction and eccentric portions 52 and 53 that are eccentric with respect to said shaft main body 51.

The shaft main body 51 may have a diameter smaller than that of each of the crankshaft holes 31b and 32d In the rotation axis C1 direction, the shaft main body 51 may extend from the crankshaft hole 32d to an outer side of the first axis direction end surface 31A. The shaft main body 51 may be rotatably supported by the inner peripheral surface of the crankshaft hole 31b via the crank bearing 6A and rotatably supported by the inner peripheral surface of the crankshaft hole 32d via the crank bearing 6B.

The eccentric portions 52 and 53 may be mounted at a middle portion of the shaft main body 51 so as to be eccentric with respect to a rotation center axis of said shaft main body 51. The after-mentioned oscillating gear 4 may be mounted to the eccentric portions 52 and 53 via a roller bearing. Thus, the eccentric portions 52 and 53 and the oscillating gear 4 may be rotatable relative to each other.

The oscillating gear 4 may be positioned in the outer cylinder 2 and interposed between the first member 31 and the substrate portion 32a of the second member 32 in the rotation axis C1 direction. The oscillating gear 4 may have a first oscillating gear 41 mounted on the first eccentric portion 52 and a second oscillating gear 42 mounted on the second eccentric portion 53.

The oscillating gears 41 and 42 may each have an outer diameter slightly smaller than an inner diameter of the outer cylinder 2. A plurality of outer teeth may be formed on an outer peripheral surface of each of the oscillating gears 41 and 42. The number of the outer teeth formed on the outer peripheral surface of each of the oscillating gears 41 and 42 may be slightly smaller than the number of the inner-tooth pins 8. Thus, the first oscillating gear 41 and the second oscillating gear 42 can perform oscillating rotation at different phases from each other so that the outer teeth are engaged with the inner-tooth pins 8 inside the outer cylinder 2.

In the first oscillating gear 41, there may be formed a center hole 41a corresponding to a position of the center holes 31a and 32c, an insertion hole 41b into which the shaft portion 32b is inserted, and a crankshaft hole 41c into which the first eccentric portion 52 is inserted. The center hole 41a, the insertion hole 41b, and the crankshaft hole 41c may pass through the first oscillating gear 41 in the rotation axis C1 direction.

In the second oscillating gear 42, there may be formed a center hole 42a corresponding to a position of the center holes 31a and 32c, an insertion hole 42b into which the shaft portion 32b is inserted, and a crankshaft hole 42c into which the second eccentric portion 53 is inserted. The center hole 42a, the insertion hole 42b, and the crankshaft hole 42c may pass through the second oscillating gear 42 in the rotation axis C1 direction.

Although in this embodiment, the oscillating gear 4 may have two oscillating gears, which are the first oscillating gear 41 and the second oscillating gear 42, without any limitation thereto, it may also be possible that the oscillating gear 4 has only one oscillating gear or three or more oscillating gears.

The transmission gear 7 may transmit an input torque to the crankshaft 5 to cause said crankshaft 5 to rotate. In this embodiment, three transmission gears 7 may be provided so as to correspond to respective positions of the three crankshafts 5. In the rotation axis C1 direction, the transmission gear 7 may be positioned on an opposite side to the second member 32, with the first member 31 interposed therebetween. In the rotation axis C1 direction, the transmission gear 7 may be mounted to the shaft main body 51 of the crankshaft 5, which protrudes to an outer side of the first axis direction end surface 31A. Movement of the transmission gear 7 in the rotation axis C1 direction may be restricted by retaining rings mounted to a small diameter portion of the shaft main body 51 so as to sandwich said transmission gear 7 from both sides in said rotation axis C1 direction.

While in this embodiment, in the rotation axis C1 direction, the transmission gear 7 may be positioned on an opposite side to the second member 32, with the first member 31 interposed therebetween, there is no limitation thereto. It may also be possible that the transmission gear 7 is positioned, for example, between the first eccentric portion 52 and the second eccentric portion 53. That is, an arrangement of the transmission gear 7 may be arbitrary and can be changed as appropriate in accordance with a configuration of the gear device X1.

The transmission gear 7 may have a plurality of outer teeth on an outer peripheral surface thereof. An input shaft or the like of an unshown motor may be engaged with said plurality of outer teeth, and thus an input torque of said motor may be transmitted to the crankshaft 5. Further, the eccentric portions 52 and 53 of the crankshaft 5 may rotate, and correspondingly thereto, the oscillating gear 4 may perform oscillating rotation in the outer cylinder 2. Thus, relative rotation between the outer cylinder 2 and the carrier 3 may be performed.

Figure 3:
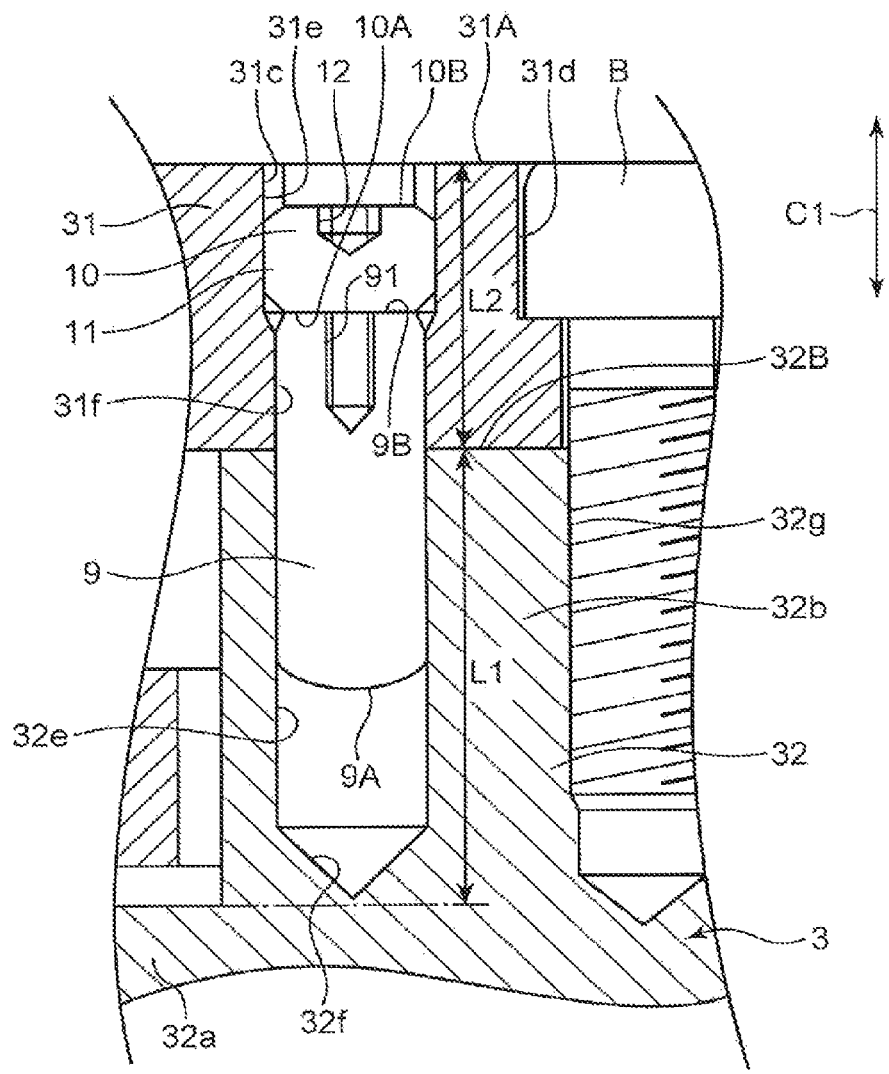
FIG. 3 is an enlarged view of a relevant portion of the gear device shown in FIG. 1.
Figure 4:
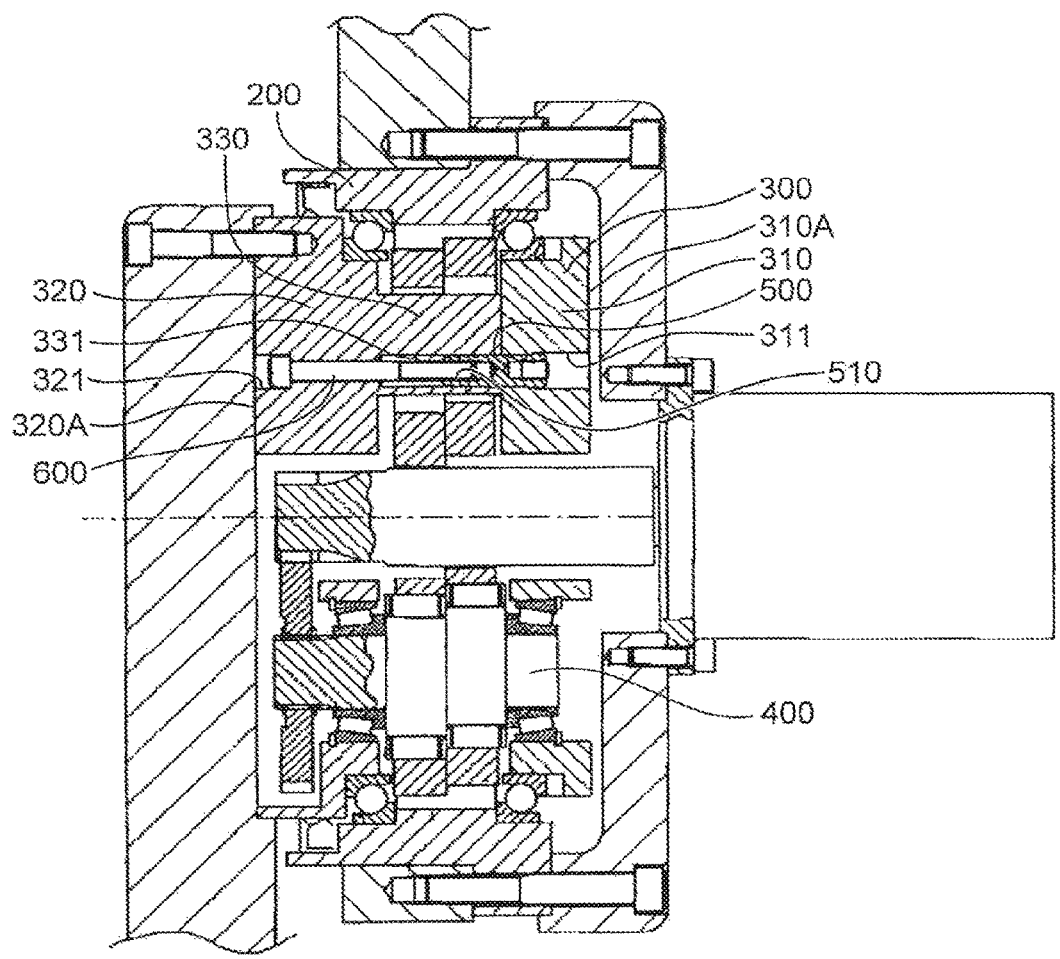
FIG. 4 is a schematic sectional view of a gear transmission device according to the publication of Japanese Patent No. 5563831.

Here, as shown in FIG. 1 and FIG. 3, the gear device X1 may be provided further with the insertion pin 9 housed in the first hole 31c and the second hole 32e and the restriction member 10 that restricts movement of said insertion pin 9.

For example, in an assembly process of the carrier 3, the insertion pin 9 may function as a positioning member that performs relative positioning between the first member 31 and the second member 32. Furthermore, when the carrier 3 of the gear device X1 rotates, the insertion pin 9 may act also to transmit a torque between the first member 31 and the second member 32.

The insertion pin 9 may be a pin member having a tapered shape. The insertion pin 9 may include a first distal surface 9A that is one of distal surfaces of said insertion pin 9 in a length direction thereof (the rotation axis C1 direction) and a second distal surface 9B that is the other distal surface on an opposite side to said first distal surface 9A. The first distal surface 9A may be a surface facing a second axis direction end surface 32A side. The second distal surface 9B may be a surface facing a first axis direction end surface 31A side. The second distal surface 9B may be a surface on a restriction member 10 side and be opposed to the restriction member 10. Furthermore, the insertion pin 9 may have a female screw hole 91 into which a bolt member is inserted. The bolt member is used to pull out said insertion pin 9 from the first hole 31c and the second hole 32e. The female screw hole 91 may be formed on the restriction member 10 side of the insertion pin 9 and formed to be open on the second distal end surface 9B.

The insertion pin 9 may be inserted into the first hole 31c and the second hole 32e so that a part thereof is housed in said first hole 31c, while a remaining part thereof is housed in said second hole 32e. Specifically, this is explained as follows.

An inner peripheral surface of the first hole 31c in the first member 31 may have a female screw portion 31e and a tapered portion 31f.

The female screw portion 31e may be formed by processing a part of the inner peripheral surface of the first hole 31c into a female screw shape. In the rotation axis C1 direction, the female screw portion 31e may be provided on a side closer to the first axis direction end surface 31A with respect to the tapered portion 31f.

In the rotation axis C1 direction, the tapered portion 31f may be continuous with the female screw portion 31e. The tapered portion 3 if may be formed in a tapered shape tapered down toward a second member 32 side in the rotation axis C1 direction.

Furthermore, the second hole 32e may be formed in a tapered shape tapered down toward the second axis direction end surface 32A side in the rotation axis C1 direction so as to correspond to the tapered portion 31f of the first hole 31c.

In a state where the first hole 31c of the first member 31 and the second hole 32e of the second member 32 are aligned with each other, the insertion pin 9 may be inserted from the first axis direction end surface 31A side in the rotation axis C1 direction along said rotation axis C1 direction into the first hole 31c and the second hole 32e. Further, an outer peripheral surface of the insertion pin 9 formed in a tapered shape may come in contact with respective inner peripheral surfaces of the tapered portion 31f and the second hole 32e, so that the insertion pin 9 may be stopped from being inserted. In this state, the insertion pin 9 may be supported by the inner peripheral surface of the first hole 31c and the inner peripheral surface of the second hole 32e, and a part of the insertion pin 9 may be housed in the tapered portion 31f of the first hole 31c, while a remaining part of the insertion pin 9 may be housed in the second hole 32e.

In this embodiment, movement of the insertion pin 9 to the second axis direction end surface 32A side in the rotation axis C1 direction may be restricted by the tapered shape of each of the tapered portion 31f of the first hole 31c and the second hole 32e. That is, the first hole 31c and the second hole 32e may have such a shape as to restrict movement of the insertion pin 9 to a second hole 32e side in the rotation axis C1 direction. Therefore, as shown in FIG. 3, in the rotation axis C1 direction, the bottom surface 32f of the second hole 32e and the first distal surface 9A of the insertion pin 9 may be away from each other.

In a case where, as in this embodiment, movement of the insertion pin 9 to the second axis direction end surface 32A side in the rotation axis C1 direction may be restricted by the tapered shape of each of the first hole 31c and the second hole 32e, it may not be required that the second hole 32e be a bottomed hole having the bottom surface 32f. For example, it may also be possible that the second hole 32e is a through hole passing through the second member 32 from the end surface 32B to the second axis direction end surface 32A. In this case, it may also be possible that movement of the insertion pin 9 to the second axis direction end surface 32A side is restricted by the first hole 31c or that movement of the insertion pin 9 to the second axis direction end surface 32A side is restricted by the second hole 32e.

Furthermore, in this embodiment, as shown in FIG. 3, the female screw hole 91 may fit within a thickness range L2 of the first member 31 in the rotation axis C1 direction. Therefore, a section of the insertion pin 9, which fits within a thickness range L1 of the shaft portion 32b in the rotation axis C1 direction, may be formed to be solid with no hole formed on an inner side thereof.

The restriction member 10 may act to restrict movement of the insertion pin 9 to the first hole 31c side in a length direction thereof. In this embodiment, the insertion pin 9 may be housed in the first hole 31c and the second hole 32e formed along the rotation axis C1 direction, and thus the length direction of the insertion pin 9 may correspond with the rotation axis C1 direction. That is, in this embodiment, the restriction member 10 may restrict movement of the insertion pin 9 to the first axis direction end surface 31A side in the rotation axis C1 direction.

The restriction member 10 may include a one-side end surface 10A that is an end surface thereof on one side in the axis direction and an other-side end surface 10B that is an end surface thereof on an opposite side to said one-side end surface 10A. Furthermore, the restriction member 10 may have a male screw portion 11 formed by processing an outer peripheral surface between the one-side end surface 10A and the other-side end surface 10B into a male screw shape and a mounting hole 12 formed by concaving a part of the other-side end surface 10B.

The restriction member 10 may be mounted in the first member 31 so as to restrict movement of the insertion pin 9 to the first axis direction end surface 31A side in the rotation axis C1 direction. Specifically, this is explained as follows.

After the insertion pin 9 is inserted from the first axis direction end surface 31A side in the rotation axis C1 direction into the first hole 31c and the second hole 32e and stopped from being inserted at a predetermined position, the restriction member 10 may be inserted from the first axis direction end surface 31A side in the rotation axis C1 direction into the first hole 31c. At this time, the male screw portion 11 of the restriction member 10 may be engaged with the female screw portion 31e on the inner peripheral surface in the first hole 31c, and thus the restriction member 10 may be mounted in the first member 31.

In this embodiment, the restriction member 10 may be configured so that the male screw portion 11 and the female screw portion 31e are engaged with each other in such a manner that the one-side end surface 10A of said restriction member 10 comes in contact with the second distal surface 9B of the insertion pin 9 in the rotation axis C1 direction. Thus, the restriction member 10 may restrict movement of the insertion pin 9 to the first axis direction end surface 31A side in the rotation axis C1 direction.

Furthermore, in this embodiment, the restriction member 10 as a whole may be housed on an inner side of the female screw portion 31e in the first hole 31c. That is, the restriction member 10 may fit within the thickness range L2 of the first member 31 in the rotation axis C1 direction.

In the gear device X1 thus described, the first hole 31c and the second hole 32e may be formed in such a shape as to restrict movement of the insertion pin 9 to the second axis direction end surface 32A side in the rotation axis C1 direction, and the insertion pin 9 may be housed in such a manner as to extend from said first hole 31c over to the second hole 32e. Further, the restriction member 10 that restricts movement of the insertion pin 9 to the first axis direction end surface 31A side in the rotation axis C1 direction may be mounted in the first member 31. That is, in the above-described gear device X1, in an assembly process of said gear device X1, after the insertion pin 9 is inserted from the first axis direction end surface 31A side into the first hole 31c and the second hole 32e, merely by mounting the restriction member 10 in the first member 31, movement of the insertion pin 9 to both sides in the rotation axis C1 direction can be restricted. Therefore, without the need to undergo a complicated assembly process, the insertion pin 9 can be inhibited from slipping out of the first hole 31c and the second hole 32e.

Moreover, in the gear device X1, the female screw hole 91 to be engaged with the bolt member that assists pulling-out of the insertion pin 9 may be formed in the insertion pin 9. Thus, for example, in a case of disassembling the carrier 3, the bolt member may be engaged with the female screw hole 91 of the insertion pin 9 and then be pulled out, and thus the insertion pin 9 can be easily pulled out from the first hole 31c and the second hole 32e.

By the way, the shaft portion 32b may have a thickness in a radial direction smaller than that of each of the substrate portion 32a and the first member 31. Because of this, as the carrier 3 rotates, a relatively high load may be applied to a section of the insertion pin 9, which fits within the thickness range L1 of the shaft portion 32b in the rotation axis C1 direction.

In this respect, in the above-described gear device X1, the female screw hole 91 may fit within the thickness range L2 of the first member 31 in the rotation axis C1 direction and thus not exist in the thickness range L1 of the shaft portion 32b. Thus, it may be possible to inhibit a decrease in strength of a section of the insertion pin 9, which lies within the thickness range L1 of the shaft portion 32b to which a relatively high load is likely to be applied, and thus to inhibit breakage of said insertion pin 9. In addition, since it may be possible to inhibit a decrease in strength of that section of the insertion pin 9, improved strength of said insertion pin 9 is obtained without the need for the insertion pin 9 to be increased in diameter, and thus it may be possible to inhibit the carrier 3 as a whole from being increased in size in the radial direction.

Moreover, in the above-described gear device X1, the second hole 32e may be a bottomed hole having the bottom surface 32f opposed to the insertion pin 9 in the rotation axis C1 direction, and thus movement of the insertion pin 9 to the second hole 32e side in the rotation axis C1 direction can be reliably inhibited by said bottom surface 32f.

Moreover, in the above-described gear device X1, after the insertion pin 9 is inserted from the first axis direction end surface 31A side into the first hole 31c and the second hole 32e, merely by engaging the male screw portion 11 with the female screw portion 31e of the first hole 31c similarly from the first member 31 side, movement of the insertion pin 9 to the first axis direction end surface 31A side in the rotation axis C1 direction can be restricted by the restriction member 10. Thus, slipping-out of the insertion pin 9 can be prevented by a more simplified assembly process.

Moreover, in the gear device X1, the restriction member 10 may fit within the thickness range L2 of the first member 31 in the rotation axis C1 direction, and thus, for example, in disposing various members such as a gear in a space on the first axis direction end surface 31A in said rotation axis C1 direction, the restriction member 10 would not interfere with the various members. Accordingly, said space can be utilized effectively.

The embodiment thus described is to be construed in all respects as illustrative and not limiting. The scope of the present invention is indicated by the appended claims rather than by the foregoing description of the embodiment, and all changes that come within the meaning and range of equivalency of the claims are intended to be embraced therein.

For example, while in the above-described embodiment, the inner peripheral surface of the first hole 31c may have the female screw portion 31e and the tapered portion 31f, there may be no limitation thereto. For example, it may also be possible that the female screw portion 31e is formed over an entire area of the inner peripheral surface of the first hole 31c in the rotation axis C1 direction.

Furthermore, while in the above-described embodiment, the insertion pin 9 may be formed in a tapered shape, and the tapered portion 31f and the inner peripheral surface of the second hole 32e may be formed in a tapered shape so as to correspond thereto, there may be no limitation thereto, and it may not required that the tapered portion 31f and the inner peripheral surface of the second hole 32e be formed in a tapered shape. In this case, for example, the insertion pin 9 may be inserted from the first axis direction end surface 31A side into the first hole 31c and the second hole 32e and stopped from being inserted at such a position that the first distal surface 9A comes in contact with the bottom surface 32f. Thus, movement of the insertion pin 9 to the second axis direction end surface 32A side in the rotation axis C1 direction may be restricted by the bottom surface 32f.

Furthermore, while in the above-described embodiment, the second distal surface 9B of the insertion pin 9 and the one-side end surface 10A of the restriction member 10 may come in contact with each other, there may be no limitation thereto. It may also be possible that the second distal surface 9B and the one-side end surface 10A are away from each other in the rotation axis C1 direction. As long as the second distal surface 9B and the one-side end surface 10A may be positioned side by side in the rotation axis C1 direction, movement of the insertion pin 9 to the first axis direction end surface 31A side can be restricted by the restriction member 10.

Furthermore, while in the above-described embodiment, the restriction member 10 as a whole may fit within the thickness range L2 of the first member 31 in the rotation axis C1 direction, there may be no limitation thereto. For example, it may also be possible that a part of the restriction member 10 is positioned on an outer side of the first axis direction end surface 31A in the rotation axis C1 direction.

Furthermore, the above-described embodiment has described an example in which the second member 32 may have the substrate portion 32a and the shaft portion 32b, there may be no limitation thereto, and it may also be possible that the first member 31 has a substrate portion and a shaft portion protruding from said substrate portion to the second member. In this case, the first hole 31c may be formed to pass through the first member 31 from an axis direction end surface of the substrate portion to an end surface of the shaft portion, and the second hole 32e may be formed as an open part of a surface of the second member 32, which comes in contact with and opposed to the end surface of the shaft portion.

Furthermore, while in the above-described embodiment, the male screw portion 11 may be formed in the restriction member 10, and said male screw portion 11 may be engaged with the female screw portion 31e, so that the restriction member 10 may be mounted in the first member 31, there may be no limitation thereto. It may be only required that the restriction member 10 be mounted in the first member 31 so as to be able to restrict movement of the insertion pin 9 to the first axis direction end surface 31A side.

For example, it may also be possible that, in a state where the insertion pin 9 is inserted in the first hole 31c and the second hole 32e, a resin member is poured into a space in the first hole 31c on a side closer to the first axis direction end surface 31A with respect to the second distal surface 9B and cured so that said resin member functions as the restriction member 10.

Furthermore, it may also be possible that the restriction member 10 is formed in a tapered shape, and the inner peripheral surface of the first hole 31c is formed in a tapered shape so as to correspond thereto, in which case, said restriction member 10 is mounted in the first member 31 by forcibly inserting the restriction member 10 into said first hole 31c.

Furthermore, while in the above-described embodiment, the plurality of crankshafts 5 may be provided at a predetermined distance from the rotation axis C1 in the radial direction and arranged in the circumferential direction, there is no limitation thereto, and it may also be possible to adopt a center-crank type gear device in which the crankshafts 5 are provided along the rotation axis C1.

The above-described embodiments may be summarized as follows.

A gear device according to this embodiment may be provided with a carrier having a first member and a second member opposed to the first member in a direction of a rotation axis, a crankshaft configured to cause relative rotation between an outer cylinder and the carrier about the rotation axis, an insertion pin configured to be inserted into the first member and the second member, and a restriction member configured to restrict movement of the insertion pin. The insertion pin may be housed in such a manner as to extend from a first hole formed in the first member by passing through said first member over to a second hole formed in the second member so as to correspond to the first hole. At least one of the first hole and the second hole may have such a shape as to restrict movement of the insertion pin to a side of the second hole in the rotation axis direction. The restriction member may be mounted in the first member so as to restrict movement of the insertion pin to a side of the first hole in the rotation axis direction.

In the above-described gear device, at least one of the first hole and the second hole may be formed in such a shape as to restrict movement of the insertion pin to the second hole side in the rotation axis direction, and the insertion pin may be housed in such a manner as to extend from the first hole over to the second hole. Further, the restriction member that restricts movement of the insertion pin to the first hole side in the rotation axis direction may be mounted in the first member. That is, in the above-described gear device, in an assembly process of the gear device, after the insertion pin is inserted into the first hole and the second hole from a first member side, merely by mounting the restriction member in the first member, movement of the insertion pin to both sides in the rotation axis direction can be restricted. Therefore, without the need to undergo a complicated assembly process, the insertion pin can be inhibited from slipping out of the first hole and the second hole.

The second member may have a substrate portion located away from the first member and a shaft portion protruding from the substrate portion to the first member and having the second hole formed therein. In the insertion pin, a female screw hole may be formed on a side of the restriction member. In the rotation axis direction, the female screw hole may fit within a thickness range of the first member.

In the above-described gear device, the female screw hole to be engaged with a bolt member that assists pulling-out of the insertion pin may be formed in the insertion pin. Thus, for example, in a case of disassembling the carrier, the bolt member may be engaged with the female screw hole of the insertion pin and then be pulled out to the first hole side in the rotation axis direction, and thus the insertion pin can be easily pulled out from the first hole and the second hole.

Compared with the substrate portion and the first member, the shaft portion may be formed to have a small thickness in the radial direction, and thus, as the carrier rotates, a relatively high load may be applied to a section of the insertion pin, which fits within a thickness range of the shaft portion in the rotation axis direction.

In this respect, in the above-described gear device, the female screw hole may fit within the thickness range of the first member in the rotation axis direction and thus not exist in the thickness range of the shaft portion. Thus, it may be possible to inhibit a decrease in strength of a section of the insertion pin, which lies within the thickness range of the shaft portion to which a relatively high load is likely to be applied, and thus to inhibit breakage of the insertion pin. In addition, since it may be possible to inhibit a decrease in strength of said section of the insertion pin, improved strength of the insertion pin is obtained without the need for the insertion pin to be increased in diameter, and thus it may be possible to inhibit the carrier as a whole from being increased in size in the radial direction.

The second hole may be a bottomed hole having a bottom surface opposed to the insertion pin in the rotation axis direction.

In the above-described gear device, the second hole is a bottomed hole having the bottom surface opposed to the insertion pin in the rotation axis direction, and thus movement of the insertion pin to the second hole side in the rotation axis direction can be reliably inhibited by the bottom surface.

The inner peripheral surface of the first hole may have a female screw portion. The restriction member may have a male screw portion to be engaged with the female screw portion so as to fix said restriction member to the first member.

In the above-described gear device, after the insertion pin is inserted from the first member side into the first hole and the second hole, merely by engaging the male screw portion with the female screw portion of the first hole similarly from the first member side, movement of the insertion pin to the first hole side in the rotation axis direction can be restricted by the restriction member. Thus, slipping-out of the insertion pin can be prevented by a more simplified assembly process.

In the rotation axis direction, the restriction member may fit within the thickness range of the first member.

In the above-described gear device, the restriction member may fit within the thickness range of the first member in the rotation axis direction, and thus, for example, in disposing a transmission gear or the like in a space on an outer side of the first member in the rotation axis direction, the restriction member would not interfere with the transmission gear or the like. Accordingly, said space can be utilized effectively.

This application is based on Japanese Patent application No. 2016-137751 filed in Japan Patent Office on Jul. 12, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A gear device, comprising:
   a carrier having:
      a first member; and
      a second member opposed to the first member in a direction of a rotation axis;
   a crankshaft configured to cause relative rotation between an outer cylinder and the carrier about the rotation axis;
   an insertion pin inserted into the first member and the second member; and
   a restriction member configured to restrict movement of the insertion pin,
   wherein the insertion pin is housed in such a manner as to extend from a first hole over to a second hole, the first hole formed in the first member so as to extend through the first member, the second hole formed in the second member so as to correspond to the first hole,
   at least one of the first hole and the second hole has such a shape as to restrict movement of the insertion pin toward the second hole in the rotation axis direction, and
   wherein the restriction member is mounted in the first member so as to restrict movement of the insertion pin toward the first hole in the rotation axis direction,
   wherein the second member has a substrate portion located away from the first member and a shaft portion protruding from the substrate portion toward the first member and having the second hole formed therein,
   a female screw hole is formed in the restriction member side of the insertion pin,
   wherein the female screw hole extends within a thickness of the first member in the rotation axis direction, and
   a section of the insertion pin which fits within a thickness range of the shaft portion in the rotation axis direction is formed to be solid with no hole formed on an inner side thereof.

2. The gear device according to claim 1, wherein the second hole is a bottomed hole having a bottom surface opposed to the insertion pin in the rotation axis direction.

3. The gear device according to claim 2, wherein an inner peripheral surface of the first hole has a female screw portion, and
   wherein the restriction member has a male screw portion engaged with the female screw portion so as to fix said restriction member to the first member.

4. The gear device according to claim 3, wherein the restriction member extends within the thickness of the first member in the rotation axis direction.

5. The gear device according to claim 2, wherein the restriction member extends within the thickness of the first member in the rotation axis direction.

6. The gear device according to claim 1, wherein an inner peripheral surface of the first hole has a female screw portion, and
   wherein the restriction member has a male screw portion engaged with the female screw portion so as to fix said restriction member to the first member.

7. The gear device according to claim 6, wherein the restriction member extends within the thickness of the first member in the rotation axis direction.

8. The gear device according to claim 1, wherein the restriction member extends within a thickness of the first member in the rotation axis direction.

9. A gear device, comprising:
   a carrier having:
      a first member; and
      a second member opposed to the first member in a direction of a rotation axis;
   a crankshaft configured to cause relative rotation between an outer cylinder and the carrier about the rotation axis;
   an insertion pin inserted into the first member and the second member; and
   a restriction member configured to restrict movement of the insertion pin,
   wherein the insertion pin is housed in such a manner as to extend from a first hole over to a second hole, the first hole formed in the first member so as to extend through the first member, the second hole formed in the second member so as to correspond to the first hole,
   at least one of the first hole and the second hole has such a shape as to restrict movement of the insertion pin toward the second hole in the rotation axis direction, and
   wherein the restriction member is mounted in the first member so as to restrict movement of the insertion pin toward the first hole in the rotation axis direction,
   an inner peripheral surface of the first hole has a female screw portion, and
   wherein the restriction member has a male screw portion engaged with the female screw portion so as to fix said restriction member to the first member.

10. The gear device according to claim 9, wherein the restriction member extends within a thickness of the first member in the rotation axis direction.

* * * * *